United States Patent Office 2,898,673
Patented Aug. 11, 1959

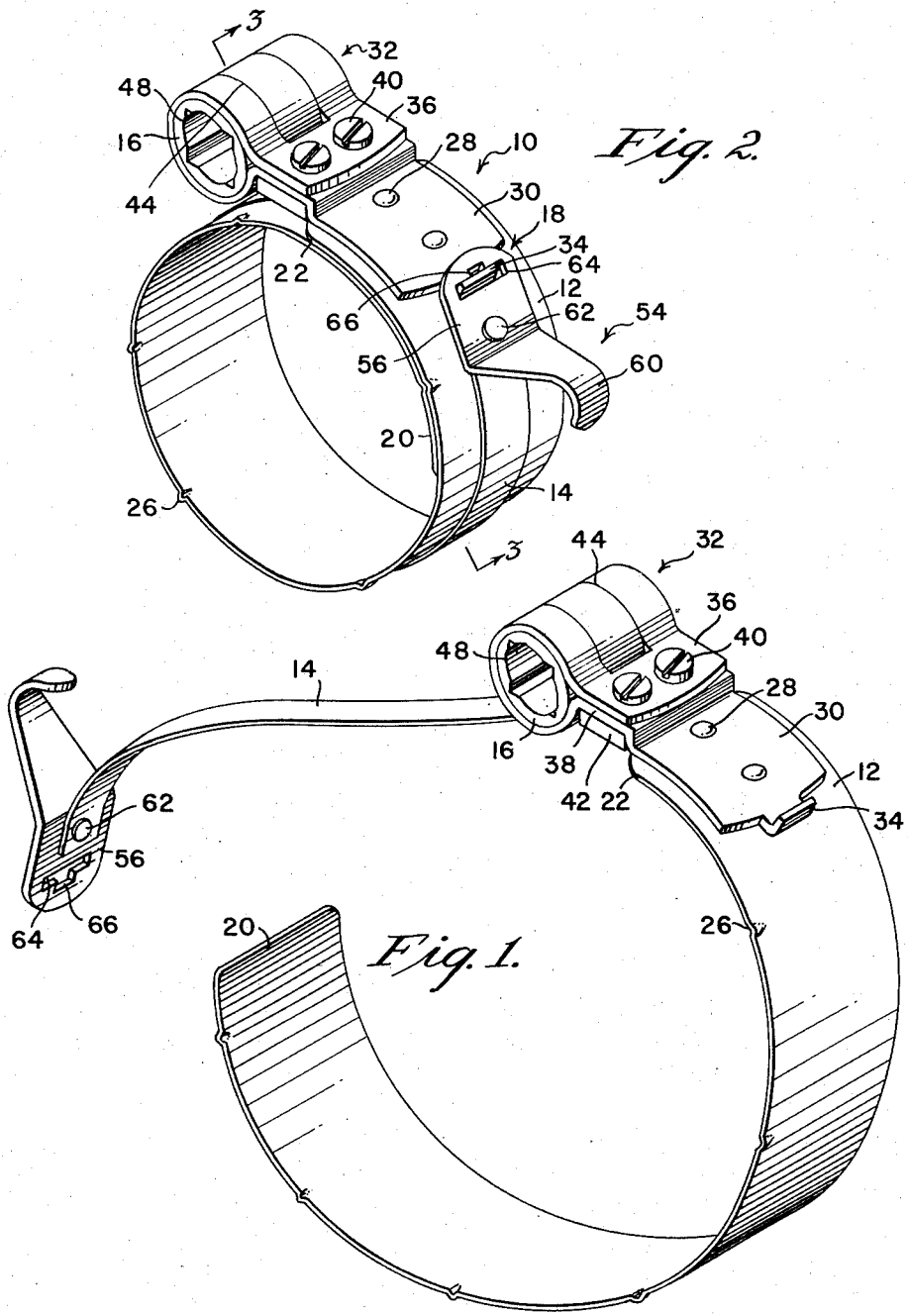

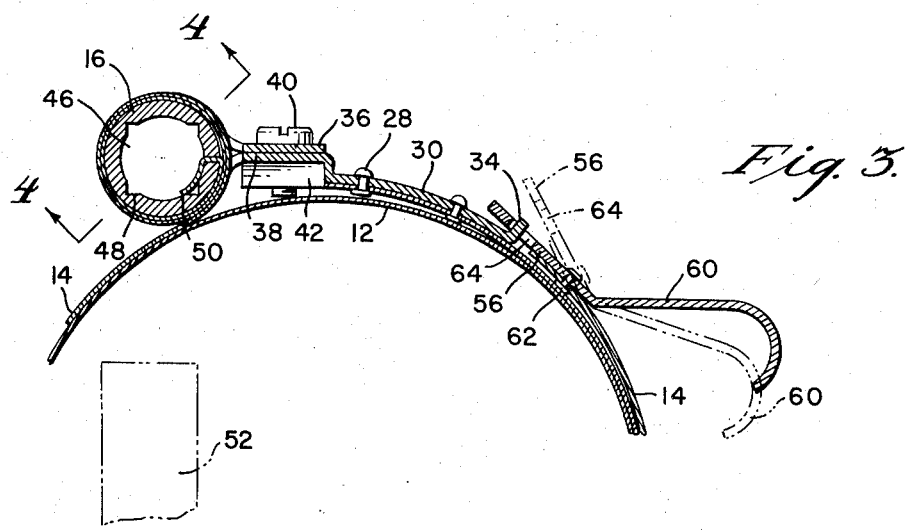
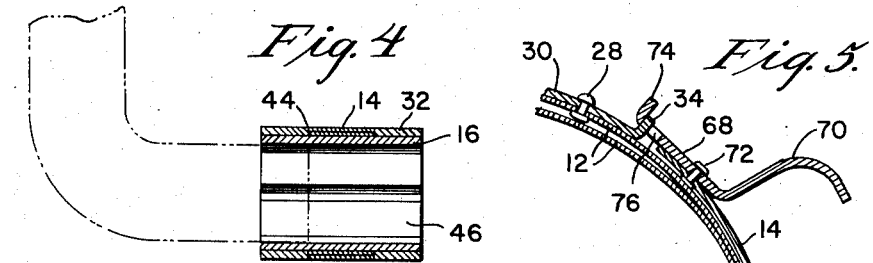
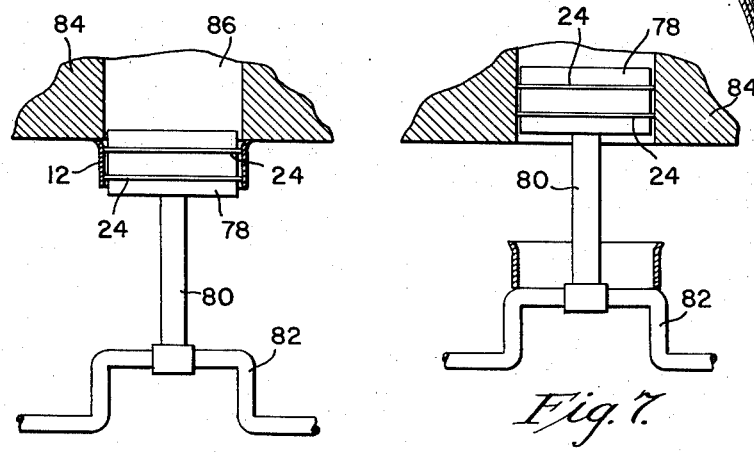

2,898,673

PISTON RING COMPRESSOR

Alf Ernferd Ericson, Lapeer, Mich., assignor to Aircraft Specialties, Inc., Lapeer, Mich., a corporation of Delaware Application June 11, 1954, Serial No. 435,979

3 Claims. (Cl. 29—224)

This invention relates to a piston ring compressor of the type employing a compression band of variable diameter and a tension band adapted to encircle the compression band and releasably retain the latter around one or more piston rings to maintain the rings in their respective grooves during installation.

In certain small motors, such as outboard motors and lawn motors, it is advisable to install piston rings without detaching the piston and connecting rod from the crankshaft. It is the primary object of the present invention to provide a split band compressor which can be efficiently used on motors of this kind without removing the piston and connecting rod from the crankshaft.

Another object of the invention is to provide a piston ring compressor of the character described employing a spool for winding the tension band, which spool is provided with sockets at both of its ends for receiving a turning wrench which can be applied to either end of the spool.

Yet another object of the invention is to provide a piston ring compressor of the character described employing a split compression band, a tension band adapted to encircle the compression band and an easily accessible catch releasably holding the tension band around the compression band so that when the catch is depressed, the compression band will open and allow for easy removal of the compressor from the motor.

A further object of the invention is to provide a piston ring compressor of the split band type which is relatively simple in construction, inexpensive to manufacture, and easy to operate.

These and other objects of the invention will become more apparent as the following description proceeds in conjunction with the accompanying drawings, wherein:

Figure 1 is a perspective view of the device in its open position;

Figure 2 is a perspective view of the device in its closed position;

Figure 3 is a sectional view taken on the line 3—3 of Figure 2;

Figure 4 is a sectional view taken on the line 4—4 of Figure 3;

Figure 5 is a fragmentary sectional view through the compressor band, the tension band and the catch and illustrating a modified form of the catch;

Figure 6 is a diagrammatic view illustrating the first step in the use of the device for the installation of rings on a piston whose connecting rod remains attached to a crankshaft; and Figure 7 is a view similar to Figure 6 and illustrating a subsequent stage in the installation.

Specific reference will now be made to the drawings wherein similar reference characters are used for corresponding elements throughout.

The device is generally indicated at 10 and comprises essentially a split compression band 12, a tension band 14 adapted to encircle the compression band, a spool 16 for winding the tension band and a catch mechanism 18 for releasably holding the tension band around the compression band.

The compression band 12 may be of varying width and includes two ends 20 and 22 which are adapted to overlap each other and form a circle for the compression of one or more piston rings 24, as shown in Figures 2 and 6.

The upper edge of the compression band 12 includes a number of spaced protuberances 26 struck out from the surface thereof for a purpose soon to appear. The compression band is preferably made of spring steel of equivalent metal.

Secured by suitable rivets, peened pins or the like 28 to the end 22 of the compression band is a plate 30 which is an extension of a split collar 32 which forms the bearing for the spool 16. The forward end of the plate 30 has an upstanding finger 34 for a purpose soon to appear.

The split collar 32 includes a circular portion forming the bearing for the spool 16. The collar 32 includes an extension 36 which is secured to the rear portion 38 of the plate 30 by means of suitable screws 40 and nuts 42. Bearing tension on the spool 16 can be adjusted by the screws 40 and nuts 42. The circular bearing portion of the split collar 32 is cut-out as at 44, the cut-out portion being at least equal in width to the width of the tension band 14.

The spool 16 includes a central bore 46 which opens through both ends thereof and at both of the open ends the bore is provided with wrench-receiving sockets 48. If desired, the entire bore 46 may be substantially square in cross section to provide squared open wrench-receiving sockets at its ends. One end 50 of the tension band 14 is retained in the spool by extending it into a suitable slit in the spool, as shown clearly in Figure 3.

A suitable tool such as the wrench 52 of square cross section may be inserted into the spool through either end thereof and rotation of the wrench in a particular direction will wind the tension band on the spool, the tension band locating itself in the cut-out portion 44 of the split collar 32, as shown clearly in Figures 1, 2 and 4. Because of the frictional engagement between the spool and the split clamp, the tension band can be wound upon the spool in such a manner as to allow the tension band to remain wound without a constant torque being applied to the spool; and since the tension band encircles the compression band, it is manifest that the diameter of the compression band can be adjustably varied to accommodate piston rings of varying diameters. After the tension band has been made to encircle the compression band, as shown in Figure 2, the tension band is releasably attached to the compression band by the means 18. The releasable means 18 comprises the upstanding finger 34 and a manually operable catch 54 adapted to engage the finger.

In the form of the invention shown in Figures 1–4, the catch 54 includes a flat plate 56 and an upstanding lug 60. Adjacent the juncture between the flat plate 56 and the upstanding lug 60, the catch is secured by a suitable rivet 62 to the free end of the tension band 14. The flat plate 56 includes a transversely extending slot 64 through which the upstanding finger 34 is adapted to extend. The engagement of the finger in the slot is clearly shown in solid lines in Figure 3. When the upstanding lug 60 is manually depressed, the catch 54 will rock at its corner to the extent that the slot 64 will become disengaged from the finger 34, as shown in phantom lines in Figure 3. When the tension band 14 is so released it, as well as the split compression band 12 opens up. The slot 34 may, if desired, be communicated with a smaller opening 66, the function of which is to admit the insertion of a screwdriver or similar tool to assist in the release of the catch if it should accidentally stick.

A modification of the releasable catch is shown in Figure 5 and consists of a flat plate 68 and an upstanding lug 70 integral therewith. Adjacent the juncture of the flat plate and the upstanding lug, the catch is secured by a suitable rivet 72 to the free end of the tension band 14. The forward or free end of the flat plate 68 is provided with an upstanding finger 74 and to the rear of this finger there is provided a transverse slot 76. Thus when the finger 34 engages in the slot 76 it also bears against the upstanding finger 74 of the catch. A downward pressure on the upstanding lug 70 will rock the catch about its corner and lift it out of engagement with the finger 34. It has been found that the cooperating fingers 34 and 74 provide a smooth rocking and releasing action.

The application of the present piston ring compressor is diagrammatically illustrated in Figures 6 and 7. The piston 78 remains attached by its connecting rod 80 to the crankshaft 82 after the block 84 containing the cylinder 86 has been elevated to expose the piston. The rings 24 are positioned in their respective grooves in the piston and are maintained in their grooves by the compression band 12. This is effected by overlapping the ends of the compression band, encircling the tension band around the compression band and attaching it by the catch to the upstanding finger 34. The wrench 52 is then inserted into either end of the spool depending upon its accessibility and turning the wrench to wind the tension band in order to obtain the proper clamping action around the piston ring.

The block 84 is then positioned to engage the out-struck portions 26 of the compression band and then the block is moved downwardly so that the piston compressor is moved off the ring and the rings are maintained in place by the wall of the cylinder 86, as shown in Figure 7. When this occurs, the piston compressor falls down and rests upon the crankshaft 82. Before the block is finally bolted down, the mechanic reaches his hand into the small space remaining and depresses the catch lug 60 or 70. When the catch disengages the finger 34 both the tension band 14 and the compression band 12 open up to permit the easy removal of the piston compressor. Thereafter, the block is bolted in its final position.

While preferred embodiments of the invention have been shown and described hereabove, it will be understood that minor variations may be made by skilled artisans without departing from the spirit of the invention and the scope of the appended claims.

I claim:

1. A piston ring compressor comprising a spring compression band having ends adapted to overlap to permit relative movement between said ends, a split-collar including a circular bearing portion and a pair of extensions, one of said extensions being secured to one end of said compression band, a windable spool rotatably mounted in said circular bearing portion, means adjustably clamping said extensions together whereby said spool may be wound and frictionally retained in said bearing without a constant torque being applied thereto, said spool having a peripheral portion which is not covered by said bearing, a flexible tension band secured to said spool and passing around said uncovered peripheral portion of said spool, said tension band being adapted to encircle said compression band, and means to releasably attach the free end of said tension band to said one end of said compression band after said tension band has encircled said compression band, said last-named means including an upstanding finger carried by said one of said split-collar extensions, and a catch comprising a flat plate and an upstanding lug, means securing said flat plate to said free end of said tension band adjacent the juncture of said flat plate and said upstanding lug, and a slot adjacent the free end of said plate adapted to engage said finger and to be released therefrom by exerting pressure on said lug towards said tension band.

2. The combination of claim 1 and an upstanding finger carried by said flat plate of said catch at its free end, said upstanding finger of said catch being adapted to abut said upstanding finger carried by said one of said split-collar extensions when said compression band finger is engaged in said catch slot.

3. A piston ring compressor comprising a spring compression band having inner and outer overlapping ends, a bearing secured to the outer end of said compression band, a windable spool rotatably mounted in said bearing so as to allow said spool to remain wound at a desired adjusted position without a constant torque being applied thereto, a flexible tension band secured at one of its ends to said spool passing around the periphery of said spool and then encircling said compression band and means releasably attaching the free end of said tension band to said outer end of said compression band, whereby the diameter of said compression band can be varied by the adjustable winding of said spool, said releasable means including an upstanding finger carried by said compression band adjacent said outer end thereof, and a catch comprising a flat plate and an upstanding lug, means securing said flat plate to said free end of said tension band adjacent the juncture of said flat plate and said upstanding lug, and a slot adjacent the free end of said plate engaging said finger and adapted to be released therefrom by exerting pressure on said lug towards said tension band.

References Cited in the file of this patent

UNITED STATES PATENTS

| | | |
|---|---|---|
| 1,663,084 | Ling | Mar. 20, 1928 |
| 1,811,248 | Spencer | June 23, 1931 |
| 1,849,532 | McDevitt | Mar. 15, 1932 |
| 2,208,136 | Miller | July 16, 1940 |